United States Patent [19]

Kameyama et al.

[11] Patent Number: 4,985,478

[45] Date of Patent: Jan. 15, 1991

[54] THERMOSETTING RESIN COMPOSITION

[75] Inventors: Masao Kameyama; Shigeyuki Kumagawa, both of Ichihara, Japan

[73] Assignee: Mitsui Petrochemical Industries, Ltd., Tokyo, Japan

[21] Appl. No.: 250,613

[22] Filed: Sep. 29, 1988

[30] Foreign Application Priority Data

Sep. 30, 1987 [JP] Japan ................... 62-244247

[51] Int. Cl.$^5$ .................. C08L 79/08; C08K 7/28; C08K 7/14
[52] U.S. Cl. .................. 523/219; 523/466; 523/460; 524/514; 525/422
[58] Field of Search ............... 525/422; 523/219, 466, 523/460; 524/514

[56] References Cited

U.S. PATENT DOCUMENTS

| | | | |
|---|---|---|---|
| 3,998,904 | 12/1976 | Balme et al. | 525/422 |
| 4,005,154 | 1/1977 | Bargain | 525/422 |
| 4,346,206 | 8/1982 | Takahashi et al. | 525/422 |
| 4,595,623 | 6/1986 | Du Pont et al. | 523/219 |

FOREIGN PATENT DOCUMENTS 61-272227 12/1986 Japan ................... 525/422

OTHER PUBLICATIONS

Lee et al.; Handbook of Epoxy Resins; McGraw-Hill Book Co.; 1967; pp. 2-11, 4-12, 6-33, 14-12, 19-11, 19-13, 19-14, 22-47.

Primary Examiner—Lewis T. Jacobs
Attorney, Agent, or Firm—Sherman and Shalloway

[57] ABSTRACT

Disclosed is a thermosetting resin composition comprising (a) a preliminary reaction product between a polyamino compound and an unsaturated bismaleimide compound, (b) an epoxy group-containing vinyl compound, (b') a vinyl group-free aliphatic or aromatic halogenated epoxy compound, (c) an epoxy curing agent and (d) a radical polymerization initiator as indispensable components. This composition is characterized in that the vinyl group-free aliphatic or aromatic halogenated epoxy compound as the component (b') is incorporated. This unsaturated bismaleimide type thermosetting resin composition is excellent in not only heat resistance and strength but also flame retardancy and light weight characteristic.

15 Claims, No Drawings

THERMOSETTING RESIN COMPOSITION

BACKGROUND OF THE INVENTION (1) Field of the Invention

The present invention relates to an unsaturated bismaleimide compound type thermosetting resin composition. More particularly, the present invention relates to a thermosetting liquid resin composition which is excellent in not only heat resistance and strength but also flame retardancy and light weight characteristic.

(2) Description of the Prior Art

A thermoset product of an unsaturated bismaleimide compound obtained by reacting an amine with maleic anhydride has an excellent heat resistance, and moreover, since the curing polymerization reaction is an addition reaction, no volatile component is formed at the curing step and a dense cured product is advantageously obtained. However, since the unsaturated bismaleimide compound is poor in the solubility in an ordinary organic solvent, a high-boiling-point solvent having a high polarity, such as dimethylformamide or N-methylpyrrolidone, should be used for formation of a solution of this compound. As means for improving this low solubility, there has been adopted a method in which the unsaturated bismaleimide compound is modified by incorporation of, for example, an epoxy resin, but this method is defective in that a precipitate is formed at room temperature or the viscosity becomes too high. Accordingly, a thermosetting resin composition of this type can hardly be used in the form of a solvent-free composition.

Under this background, we previously proposed an unsaturated bismaleimide compound type thermosetting resin composition which can be used in the form of a solvent-free composition (Japanese Patent Application Laid-Open Specification No. Sho 61-272227).

This resin composition comprises (a) a preliminary reaction product between a polyamino compound and an unsaturated bismaleimide compound, (b) an epoxy group-containing vinyl compound, (c) an epoxy curing agent and (d) a radical polymerization initiator as indispensable components.

The above-mentioned composition according to the prior art is sufficiently satisfactory in such characteristics as heat resistance and strength, but is still insufficient in flame retardancy, light weight characteristic and the like.

At the present, development of a molding material which is excellent in not only such characteristics as heat resistance and strength but also flame retardancy and light weight characteristic is especially desired mainly in the fields of aerial navigation and space development. The above-mentioned composition fails to satisfy this requirement.

SUMMARY OF THE INVENTION

It is therefore a primary object of the present invention to provide an unsaturated bismaleimide type thermosetting resin composition which is excellent in not only such characteristics as heat resistance and strength but also flame retardancy and light weight characteristic.

More specifically, in accordance with the present invention, there is provided a thermosetting resin composition which comprises (a) a preliminary reaction product between a polyamino compound and an unsaturated bismaleimide compound, (b) an epoxy group-containing vinyl compound, (b') a vinyl group-free aliphatic or aromatic halogenated epoxy compound, (c) an epoxy curing agent and (d) a radical polymerization initiator as indispensable components, said preliminary reaction product as the component (a) being formed by the preliminary reaction conducted substantially in the absence of the epoxy group-containing vinyl compound as the component (b).

DETAILED DESCRIPTION OF THE PREFERRED EMBODIMENTS

The respective components used in the present invention will now be described.

Component (a)

The component (a) consists of a preliminary reaction product between a polyamino compound and an unsaturated maleimide compound.

As the polyamino compound, there can be used, for example, amino compounds represented by the following general formula:

wherein R stands for an aromatic group having a valency of at least 2, such as an alkylene group, a cycloalkylene group or an arylene group, or a combination of such groups bonded directly or through other binding group, and m is an integer of at least 2, though polyamino compounds that can be used in the present invention are not limited to the amino compounds represented by the general formula (1).

As specific examples, there can be mentioned diamino compounds such as 4,4'-diaminodicyclohexylmethane, 1,4-diamino cyclohexane, 2,6-diaminopyridine, m-phenylenediamine, p-phenylenediamine, 4,4'-diaminodiphenylmethane, 4,4'-diaminodiphenyl ether, 2,2-bis(4-aminophenyl)propane, benzidine, 4,4'-diaminodiphenylsulfone, 4,4'-diaminodiphenylsulfide, bis(4-aminophenyl)methylphosphine, m-xylylenediamine, 1,5-diaminonaphthalene, p-xylylenediamine, hexamethylenediamine, 1,4'-diaminobenzophenone, 2,5-bis(m-aminophenyl)-1,3,4-oxadithiazole, 2,5-bis(p-aminophenyl)-1,3,4-oxadithiazole, 4,4'-bis(p-aminophenyl)-2,2'-dithiazole, 3,4'-diaminobenzanilide, 2,2'-bis(m-aminophneyl)-5,5 benzimidazole and N,N'bis(p-aminobenzoyl)-4,4'-diaminodiphenylmethane, and compounds having at least three amino groups, such as 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 2,4,6-triaminopyridine, 2,4,4'-triaminodiphenylmethane, p-aminophenyl-4,4'-diphenylmethane, tri(4-aminophenyl)methane, 2,4,4'-triaminobenzophenone, 3,5,4'-triaminobenzanilide, melamine-1,2,4,5-tetraminobenzene, 2,3,6,7-tetraaminonaphthalene, 3,3',4,4'tetraaminodiphenylether, 3,3',4,4'-tetraaminodiphenylmethane, 3,5-bis(3,4'-diaminophenyl)pyridine and compounds represented by the following formula:

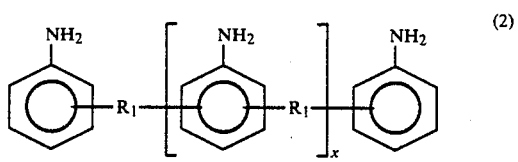

wherein R₁ stands for an organic group having 1 to 8 carbon atoms, and x is a number of 0, 1 or 2.

As the unsaturated bismaleimide compound to be used in combination with the above-mentioned polyamino compound, there can be mentioned compounds represented by the following general formula:

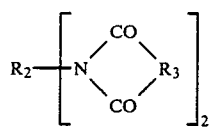

wherein $R_2$ stands for an alkylene group having at least two carbon atoms, a cycloalkylene group, an arylene group or an organic group comprising at least two of the foregoing groups bonded together, and $R_3$ stands for a divalent organic group having a carbon-to-carbon double bond.

As specific examples, there can be mentioned N,N'-phenylenebismaleimide, N,N'-4,4'-diphenylmethane bismaleimide, N,N'-hexamethylenebismaleimide, N,N'-methylene-di-p-phenylenebismaleimide, N,N'-oxy-diphenylenebismaleimide, N,N'-4,4'-benzophenonebismaleimide, N,N'-p-diphenylsulfonebismaleimide, N,N'(3,3'-dimethyl)-methylene-p-phenylenebismaleimide, N,N'4,4'-dicyclohexylmethane-bismaleimide, N,N'-m-xylylenebismaleimide, N,N'-p-xylylenebismaleimide, N,N'-(3,3'-diethyl)-methylene-di-p-phenylenebismaleimide, N,N'-m-toluylene-dimaleimide and a reaction product of an aniline-formalin reaction product with maleic anhydride.

The unsaturated bismaleimide compound may be substituted by up to about 60% by weight of a monomaleimide compound such as N-allylmaleimide, N-propylmaleimide, N-hexylmaleimide or N-phenylmaleimide.

The polyamino compound and the unsaturated bismaleimide compound is used in the form of a preliminary reaction product in which the latter compound is contained in an amount of about 0.1 to about 10 gram-equivalents, preferably about 0.5 to about 5 gram-equivalents, per gram-equivalent of the former compound. For the production of the preliminary reaction product, both the compounds are heated and kneaded at about 70 to about 170° C. in the absence of the epoxy group-containing vinyl compound as the component (b) by using, for example, a roll to form a prepolymer. The amino group of the polyamino compound is bonded by Michael addition to the unsaturated bond of the bismaleimide compound, whereby a polyaminobismaleimide can be formed.

In the present invention, since the curing polymerization reaction is an addition reaction, the above-mentioned component (a) does not form a volatile component in the curing polymerization and a dense cured product is obtained. In addition to this advantage, there can be attained an advantage that the component (a) can be uniformly dissolved in the component (b) even at normal temperature.

Component (b)

As the epoxy group-containing vinyl compound as the component (b), there can be used, for example, compounds represented by the following general formula:

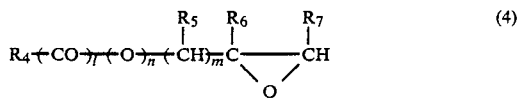

wherein $R_4$ stands for a vinyl group-containing hydrocarbon group such as a vinyl group or an allyl group, $R_5$, $R_6$ and $R_7$ independently stand for a hydrogen atom or an alkyl group having up to 4 carbon atoms or $R_5$ and $R_7$ may be bonded together to form a linear alkylene group, and each of l, m and n is a number of zero or 1. Specifically, glycidyl acrylate, glycidyl methacrylate and allylglycidyl ether are preferably used.

The epoxy group-containing vinyl compound used as the component (b) acts as a diluent for the component (a). The component (b) can dissolve the component (a) uniformly therein even at normal temperature. Accordingly, without using any particular solvent, the thermosetting resin composition can be obtained in the form of a solution having a low viscosity and the operation adaptability is highly improved.

Since an epoxy group is contained in this vinyl compound, if the vinyl compound is used in combination with a predetermined curing agent, for example, when a fiber or the like is impregnated with the resin composition, the viscosity is rapidly increased and there is attained an advantage that this bodying reaction does not accompany gelation. More specifically, in the obtained bodying reaction product, the viscosity does not increase even with the lapse of time, and there can be attained a functional effect of improving the storage stability of a molding material such as SMC or a prepreg that should be kept in the state preliminary to complete curing.

The component (b) is used in an amount of 2 to 140 100 parts by weight, especially 5 to 70 parts by weight, per parts by weight of the component (a).

The component (b) can contain a styrene type monomer such as styrene, α-methylstyrene, vinyltoluene or divinylbenzene in an amount not substantially impairing the prepolymer-dissolving capacity at normal temperature. The upper limit of the amount of the styrene type monomer is ordinarily 0.1 to 10 moles, preferably 0.1 to 3 moles, per mole of the component (b). The strength of the cured product can be further improved by incorporation of the styrene type monomer.

Component (b')

In the present invention, a vinyl group-free aliphatic halogenated epoxy compound or aromatic halogenated epoxy compound is further incorporated. By incorporation of this epoxy compound, the flame retardancy of the resin composition is prominently improved without degradation of the heat resistance or strength.

For example, as is apparent from the examples given hereinafter, in a resin composition comprising a halogen-free aliphatic or aromatic epoxy compound, the flame retardancy corresponds to V-2 (UL94), while the flame retardancy of the resin composition of the present invention corresponds to V-O, and it is understood that the flame retardancy is prominently improved in the resin composition of the present invention.

Furthermore, according to the present invention, the curing shrinkage is drastically controlled by incorporation of this epoxy compound.

This component (b') is used in an amount of 1 to 100 parts by weight, especially 5 to 20 parts by weight, per 100 parts by weight of the epoxy group-containing vinyl compound as the component (b).

The aliphatic or aromatic halogenated epoxy compound used in the present invention is represented by, for example, the following general formula:

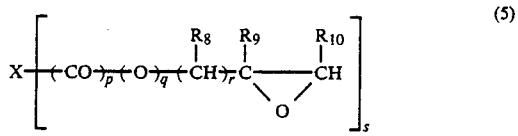

wherein X stands for a mono-, di-, tri- or tetravalent halogen-substituted aliphatic or aromatic hydrocarbon group, $R_8$, $R_9$ and $R_{10}$ independently stand for a hydrogen atom or an alkyl group having 1 to 4 carbon atoms, each of p, q and r is a number of zero or 1, and s is a number of from 1 to 4. More specifically, there are preferably used aliphatic and aromatic halogenated epoxy compounds such as dibromoneopentylglycol diglycidyl ether, dibromocresyl glycidyl ether, bromophenolnovolak glycidyl ether and 2,6,2',6'-tetrabromobisphenol A diglycidyl ether.

These halogenated epoxy compounds can be obtained, for example, by reacting a halogen-containing aliphatic alcohol or a halogen-containing aromatic phenol with epichlorohydrin.

It is preferred that the halogen content in the epoxy compound as the component (b') be 1 to 50% by weight, especially 5 to 20% by weight.

In order to obtain a liquid resin composition excellent in the operation adaptability, it is preferred that the epoxy equivalent value of the halogenated epoxy compound as the component (b') be 20 to 1000, especially 50 to 300, and that the viscosity at 25° C. be 1 to 30000 cps, especially 5 to 10000 cps.

Component (c)

Any of known epoxy curing agents can be optionally used, so far as the radical polymerization is not substantially inhibited.

As specific examples, there can be mentioned aliphatic amines, acid anhydrides, dicyandiamide, hydrazines, imidazoles and boron trifluoride/amine complex compounds.

The component (c) is used in an amount of 0.01 to 100 parts by weight, especially 0.05 to 50 parts by weight, per 100 parts by weight of the sum of the components (a), (b) and (b').

Component (d)

The following compounds can be mentioned as examples of the radical polymerization initiator used in the present invention.

(1) Compounds having —O—O—H bonded to the secondary or tertiary carbon atom, represented by isopropyl hydroperoxide, tert-butyl hydroperoxide, cumyl hydroperoxide and perbenzoic acid.

(2) Compounds having —O—O— bonded to two secondary or tertiary carbon atoms, represented diisopropyl peroxide, di-tert-butyl peroxide and dicumyl peroxide.

(3) Bisperoxides having two peroxy groups in the molecule, represented by 2,5-dimethyl-2,5-bis(tert-butylperoxy)hexane, 2,5-dimethyl-2,5-bis(tert-butylperoxy)hexyne-3, 2,5-dimethyl-2,5-bis(tert-butylperoxy)hexyne-3 and 1,3-bis(tert-butylperoxyisopropyl)benzene.

In view of the peroxy value, these bisperoxides are especially advantageous.

(4) Organic azo compounds having at least one —O—N—N— linkage in the molecular structure, represented by azobisalkanonitriles such as azobisisobutyronitrile and azobiscarboamide.

The radical initiator is used in an amount of 0.01 to 10 parts by weight, especially 0.05 to 5 parts by weight, per 100 parts by weight of the sum of the components (a), (b), (b') and (c).

The thermosetting resin composition of the present invention comprises the foregoing components (a), (b), (b'), (c) and (d) as indispensable components.

Flame Retardant (e)

In the present invention, the flame retardancy can be further improved by incorporating a flame retardant according to need.

Known flame retardants such as phosphorus compounds, halogen compounds and antimony trioxide can be used, and antimony trioxide is especially preferred.

The flame retardant is incorporated in an amount of 0.3 to 30% by weight, especially 2 to 20% by weight, based on the thermosetting resin composition.

Filler (f)

In the present invention, a filler can be incorporated as a reinforcer according to need.

As the filler, there can be mentioned inorganic fibers such as a glass fiber, a metal fiber and an asbestos fiber, carbon black, zinc oxide, clay, talc, heavy calcium carbonate, kaolin, diatomaceous earth, silica, alumina and graphite. A chopped glass fiber having a fiber length of 3 to 50 mm, especially 6 to 25 mm, is preferably used.

The filler is preferably incorporated in an amount of 20 to 70% by weight, especially 30 to 50% by weight, in the composition.

In the present invention, especially from the viewpoint of the light weight characteristic, hollow glass beads known as glass balloons are preferably incorporated in an amount of up to 30% by weight, especially 5 to 20% by weight.

Glass balloons having a pressure-resistant strength (10% fracture pressure) of at least 80 kg/cm$^2$, especially at least 120 kg/cm$^2$, an average particle size of 20 to 100 m$\mu$, especially 30 to 70 m$\mu$, and a true specific gravity of 0.1 to 0.7, especially 0.2 to 0.5, are preferably used.

Of course, known additives, for example, epoxy curing promotors such as imidazoles, boron trifluoride/amine complex compounds, tertiary amines, quanternary ammonium salts and urea compounds and internal release agents such as metal salts of higher fatty acids, can be incorporated in known amounts into the composition of the present invention.

Preparation of Resin Composition

In the preparation of the thermosetting resin composition of the present invention, at first, the preliminary reaction between the polyamino compound and the unsaturated bismaleimide compound is carried out substantially in the absence of the vinyl compound as the component (b), for example, by heating both the compounds in a reaction vessel at about 70 to about 170° C. to form a preliminary reaction product as the component (a).

This preliminary reaction is carried out to such an extent that the formed preliminary reaction product as the component (a) is dissolved in the component (b) and the preliminary reaction product is not precipitated even if the solution is allowed to stand still at room temperature (15°–25° C.)

The so-formed preliminary reaction product as the component (a) is dissolved in the component (b) and other components are incorporated into the solution under preferably 10°–50° C., especially room temperature (15°–25° C.) conditions, whereby the thermosetting resin composition of the present invention can be obtained.

The so-obtained thermosetting resin composition of the present invention gives a cured molded body excellent in not only heat resistance and strength but also flame retardancy, and if glass balloons are incorporated, the light weight characteristic is improved and the composition is especially preferably used in the fields of aerial navigation and space development.

A cured product is ordinarily obtained by heating the composition at a temperature of 120 to 170° C. for about 2 to about 15 minutes by using a heating roll or the like. Since the radical polymerization initiator is incorporated in the resin composition of the present invention, a cured product can be obtained within a very short time even at a temperature lower than 200° C.

In the present invention, since the unsaturated maleimide compound is dissolved in the form of a preliminary reaction product with the polyamino compound at room temperature in the epoxy group-containing vinyl compound having a low viscosity, the resin composition is obtained in the form of a solution having a low viscosity. Therefore, the operation adaptability of the resin composition is good and after impregnation, the viscosity is rapidly increased and this bodying reaction does not accompany gelation, with the result that the viscosity of the obtained bodying reaction product does not increase even with the lapse of time and the storage stability of a molding material such as SMC or a prepreg that should be kept in the state preliminary to complete curing is improved.

Moreover, in the thermosetting resin composition of the present invention, since the curing shrinkage is prominently controlled, the dimension stability or appearance stability of the cured molded body is not impaired. This is another advantage attained by the present invention.

The present invention will now be described in detail with reference to the following examples that by no means limit the scope of the invention.

EXAMPLE 1

Preliminary reaction was carried out by heating 82 parts by weight of N,N'-4,4'-diphenylmethane bismaleimide and 18 parts by weight of 4,4'-diaminodiphenylmethane at 130° C. for 15 minutes by using a heating roll to obtain 100 parts by weight of a prepolymer.

Then, in a glass reaction vessel, 55 parts by weight of the so-obtained prepolymer [component (a)] was mixed with 35 parts by weight of glycidyl methacrylate [component (b)] at room temperature (15°–25° C.) for 30 minutes to dissolve the prepolymer in the component (b). Then, 10 parts by weight of dibromoneopentylglycol diglycidyl ether [component (b')] of the following formula

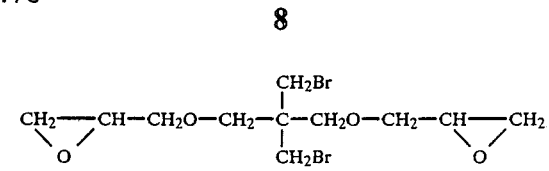

2 parts by weight of dicyandiamide [component (c)] 0.5 part by weight of 2-ethyl-4-methylimidazole (epoxy curing promotor), 1 part by weight of dicumyl peroxide [component (d)]; hereinafter referred to as "DCP", 1 part by weight of antimony trioxide [component (e), $Sb_2O_3$] and 2 parts by weight of zinc stearate (internal release agent) were incorporated into the solution to form a thermosetting resin composition.

The viscosity of the resin composition was 6,900 cps as measured at 25° C. by a Brookfield type viscometer.

Eight layers of chopped glass fiber mats (chopped fiber length=50 mm, basis weight=300 $g/m^2$) were impregnated with the so-obtained thermosetting resin composition. The impregnated mats were pressed at room temperature to prepare SMC (the thickness was about 3 mm) having a glass fiber content of about 50% by weight. Incidentally, a polyethylene film having a thickness of 50 $\mu$m was overcoated as a release film. This SMC was allowed to stand still at room temperature for several days to render SMC tack-free (non-sticky), and curing reaction was carried out at 160° C. for 3 minutes. Then, post-curing reaction was conducted for 24 hours in an air oven maintained at 200° C. to obtain a plate-like compression-molded product.

Various characteristics of the above-mentioned SMC and molded product were determined according to the following methods. The obtained results are shown in Table 1.

Viscosity of Thermosetting Resin Composition:
The viscosity was measured at 25° C. by a Brookfield type viscometer.

Impregnation of Resin Composition in Chopped Glass Fiber Mat:
This characteristic was evaluated by the naked eye observation.

Tackiness of SMC:
The tackiness of SMC was evaluated by the naked eye observation.

Drapability of SMC:
The drapability of SMC was evaluated by the naked eye observation.

Flexural Strength and Flexural Elastic Modulus of Molded Product:
These characteristics were determined at 20° C., 200° C. and 250° C. according to JIS K-6911.

Tensile Strength of Molded Product:
This characteristic was determined at 20° C. and 200° C. according to JIS K-6911.

Water Absorption of Molded Product
The water absorption of the molded product was determined under conditions of 20° C. and 24 hours according to JIS K-6911.

Storage Stability
SMC was stored at 20° C., and the retention of the drapability was evaluated by the naked eye observation.

Curing Shrinkage:
SMC was compression-molded in a mold having a marker for the measurement of the curing shrinkage, and the curing shrinkage was calculated from the difference of the size between the mold and the SMC-molded product.

Flame Retardancy:

A molded sample having a thickness of 3 mm was used, and the flame retardancy was evaluated by the vertical method according to UL94.

EXAMPLE 2

SMC and a compression-molded product were prepared in the same manner as described in Example 1 except that 20 parts by weight of glass balloons having a 10% fracture pressure of at least 150 kgf/cm$^2$, an average particles size of 40 m$\mu$ and a true specific gravity of 0.38 were incorporated in the resin composition described in Example 1 and the chopped glass fiber content was changed to 40% by weight.

The characteristics were determined in the same manner as described in Example 1. The obtained results are shown in Table 1.

EXAMPLE 3

SMC and a compression-molded product were prepared in the same manner as described in Example 2 except that the amount incorporated of the glass balloons was changed to 10 parts by weight and the chopped glass fiber content was changed to 50% by weight.

The characteristics were determined in the same manner as described in Example 1. The obtained results are shown in Table 1.

COMPARATIVE EXAMPLE 1

Preliminary reaction was carried out by heating 82 parts by weight of N,N'-4,4'-diphenylmethane bismaleimide and 18 parts by weight of 4,4'-diaminodiphenylmethane at 130° C. for 15 minutes by using a heating roll to obtain 100 parts by weight of a prepolymer.

In a glass reaction vessel, 55 parts by weight of the so-obtained prepolymer was mixed with 35 parts by weight of glycidyl methacrylate at room temperature for 30 minutes to dissolve the prepolymer, and 10 parts by weight of ethyleneglycol diglycidyl ether as the epoxy compound, 2 parts by weight of dicyandiamide as the epoxy curing agent, 0.5 part by weight of 2-ethyl-4-methylimidazole as the epoxy curing promotor, 1 part by weight of dicumyl peroxide (hereinafter referred to as "DCP") as the radical polymerization initiator and 2 parts by weight of zinc stearate as the internal release agent were incorporated in the solution to prepare a thermosetting resin composition.

The viscosity of this resin composition was 6,800 cps as measured at 25° C. by a Brookfield type viscometer.

SMC and a plate-like compression-molded product were obtained by using this resin composition in the same manner as described in Example 1.

The characteristics were determined in the same manner as described in Example 1.

The obtained results are shown in Table 1.

TABLE 1

| Components (parts by weight) | Example 1 | Example 2 | Example 3 | Comparative Example 1 |
|---|---|---|---|---|
| prepolymer* | 55 | 55 | 55 | 55 |
| glycidyl methacrylate | 35 | 35 | 35 | 35 |
| dibromoneopentylglycol ether | 10 | 10 | 10 | — |
| ethyleneglycol diglycidyl ether | — | — | — | 10 |
| dicyandiamide | 2 | 2 | 2 | 2 |
| DCP | 1 | 1 | 1 | 1 |
| 2-ethyl-4-methylimidazole | 0.5 | 0.5 | 0.5 | 0.5 |
| Sb$_2$O$_3$ | 1 | 1 | 1 | — |
| zinc stearate | 2 | 2 | 2 | 2 |
| glass ballons | — | 20 | 10 | — |
| Viscosity (25° C. cps) | 6900 | 10300 | 6900 | 6800 |
| Glass Fiber Content (% by weight) | 50 | 40 | 50 | 50 |
| Impregnation in Fibers | good | good | good | good |
| Tack Free Property | good | good | good | good |
| Drapability | 14 days | 14 days | 14 days | 14 days |
| Specific Gravity | 1.33 | 1.22 | 1.45 | 1.75 |
| Flexural Strength (Kg/mm$^2$) | | | | |
| 20° C. | 35 | 22 | 35 | 35 |
| 200° C. | 29 | 16 | 29 | 28 |
| 250° C. | 23 | 13 | 23 | 22 |
| Flexural Elastic Modulus (Kg/mm$^2$) | | | | |
| 20° C. | 1600 | 1200 | 1700 | 1600 |
| 200° C. | 1500 | 1100 | 1500 | 1400 |
| 250° C. | 1100 | 900 | 1100 | 1100 |
| Water Absorption (%) | 0.28 | 0.20 | 0.23 | 0.28 |
| Curing Shrinkage (%) | 0.18 | 0.16 | 0.15 | 0.18 |
| Flame Regardancy (UL94) | corresponding to V-O | corresponding to V-O | corresponding to V-O | corresponding to V-O |

Note
*N,N'-4,4'-diphenylmethane bismaleimide/4,4'-diaminodiphenylmethane prepolymer

We claim:

1. A thermosetting resin composition which comprises (a) a preliminary reaction product between a polyamino compound and an unsaturated bismaleimide compound, (b) an epoxy group-containing vinyl compound, (b') dibromo neopentylglycol diglycidyl ether, (c) an epoxy curing agent and (d) a radical polymerization initiator as indispensable components, said preliminary reaction product as the component (a) being formed by a preliminary reaction conducted substantially in the absence of the epoxy group-containing vinyl compound as the component (b).

2. A thermosetting resin composition as set forth in claim 1, wherein the epoxy group-containing vinyl compound as the component (b) is a compound represented by the following general formula

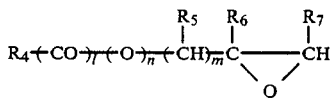

wherein $R_4$ stands for a monovalent vinyl group-containing hydrocarbon group, $R_5$, $R_6$ and $R_7$ independently stand for a hydrogen atom or an alkyl group having up to 4 carbon atoms, or $R_5$ and $R_7$ may be bonded together to form a linear alkylene group, and each of l, m and n is a number of zero or 1.

3. A thermosetting resin composition as set forth in claim 2, wherein the epoxy group-containing vinyl compound as the component (b) is at least one member selected from the group consisting of glycidyl acrylate, glycidyl methacrylate and allylglycidyl ether.

4. A thermosetting resin as set forth in claim 1, wherein the amount of the component (b) is 2 to 140 parts by weight per 100 parts by wight of the component (a), the amount of the component (b') is 4 to 100 parts by weight per 100 parts by weight of the component (b), the amount of the component (c) is 0.01 to 100 parts by weight per 100 parts by weight of the sum of the components (a), (b) and (b'), and the amount of the component (d) is 0.01 to 10 parts by weight per 100 parts by weight of the sum of the components (a), (b) and (b').

5. A thermosetting resin as set forth in claim 1, wherein in the component (a), the unsaturated bismaleimide compound is used in an amount of 0.1 to 10 gram-equivalents per gram-equivalent of the polyamino compound.

6. A thermosetting resin composition as set forth in claim 1, which further comprises (e) a flame retardant and/or (f) a filler.

7. A thermosetting resin composition as set forth in claim 6, wherein the flame retardant (e) is antimony trioxide.

8. A thermosetting resin composition as set forth in claim 6, wherein the flame retardant (e) is incorporated in an amount of 0.3 to 30% by weight.

9. A thermosetting resin composition as set forth in claim 6, wherein the filler (f) is a chopped glass fiber.

10. A thermosetting resin composition as set forth in claim 9, wherein the chopped glass fiber is incorporated in an amount of 20 to 70% by weight.

11. A thermosetting resin composition as set forth in claim 9, wherein the filler (f) is composed of glass balloons.

12. A thermosetting resin composition as set forth in claim 11, wherein the glass balloons are incorporated in an amount of up to 30% by weight.

13. A thermosetting resin composition which comprises (a) a preliminary reaction product between a polyamino compound and an unsaturated bismaleimide compound, (b) an epoxy group-containing vinyl compound, (b') dibromocresyl glycidyl ether, (c) an epoxy curing agent and (d) a radical polymerization initiator as indispensable components, said preliminary reaction product as the component (a) being formed by the preliminary reaction conducted substantially in the absence of the epoxy group-containing vinyl compound as the component (b).

14. A thermosetting resin as set forth in claim 13, wherein the amount of the component (b) is 2 to 140 parts by weight per 100 parts by wight of the component (a), the amount of the component (b') is 4 to 100 parts by weight per 100 parts by weight of the component (b), the amount of the component (c) is 0.01 to 100 parts by weight per 100 parts by weight of the sum of the components (a), (b) and (b'), and the amount of the component (d) is 0.01 to 10 parts by weight per 100 parts by weight of the sum of the components (a), (b) and (b').

15. A thermosetting resin composition as set forth in claim 13, wherein in the component (a), the unsaturated bismaleimide compound is used in an amount of 0.1 to 10 gram-equivalents per gram-equivalent of the polyamino compound.

* * * * *